United States Patent [19]

McCoy

[11] Patent Number: 4,651,967

[45] Date of Patent: Mar. 24, 1987

[54] PRINTER STAND

[76] Inventor: Harold N. McCoy, 2222 Gumtree La., Fallbrook, Calif. 92028

[21] Appl. No.: 728,832

[22] Filed: Apr. 30, 1985

[51] Int. Cl.[4] .......... F16M 1/00

[52] U.S. Cl. .......... 248/676; 248/175; 242/55.2; 211/181; D6/462; D18/23

[58] Field of Search .......... 248/676, 175, 678, 670; D6/462; D14/111, 114; D18/22, 23; 211/181; 242/55.2, 55.3, 129.6, 129.62

[56] References Cited

U.S. PATENT DOCUMENTS

| | | | |
|---|---|---|---|
| D. 250,765 | 1/1979 | Smith | D14/114 X |
| 514,182 | 2/1894 | English | 248/175 X |
| 849,290 | 4/1907 | Vanderbilt | 248/175 X |
| 1,006,328 | 10/1911 | Widenhofer | 211/181 X |
| 2,956,689 | 10/1960 | Van Der Togt | 211/181 |
| 3,043,441 | 7/1962 | Dumford | 211/181 X |
| 3,128,022 | 4/1964 | Mastrud, Jr. | 248/175 X |
| 3,225,939 | 12/1965 | Braun | 211/181 X |
| 3,586,411 | 6/1971 | Brigham | 248/175 X |
| 3,998,170 | 12/1976 | Gordon | 211/181 X |

OTHER PUBLICATIONS

Commtek Electric, Inc., advertisement (2 pages).

Multi-Mode Printer Station by Marvel Metal Products Company (2 pages).

"The Topper Saves Space . . . It Positions Printers Above the Paper", Advertisement by Marvel Metal Products Company (1 page).

"Microline Printer Floor Stand Product Information" by Grand Union Micro Systems (1 page).

"Printer Stands & Receiving Trays" by Grand Union Micro Systems (1 page) (Ad has two photos of products at top).

"Printer Stand & Receiving Trays" by Grand Union Micro Systems (1 page) (Ad has one photo of product at top).

Photograph of Product (Manufacturer Unknown).

Introducing the . . . "Printer Partner" Paper Supplier and System Furniture . . . to Solve Your Paper Problems, product brochure by Ringer Products, Inc.

"Computer Room Accessories" Ad (1 page).

"What's In Store—New Hardare", by Family Computing, p. 114.

"Buy an Epson Printer and Take A Stand. Free", ad by Fast Track Computer Store (2 pages).

"Formtrac jr.", advertisment by Formtrac Computer Furniture for Home and Office, a Division of Conservation Systems, Inc. (2 pages).

"The Newest and Best in Furnishings for Personal Computers from Universal Industries", by Universal Industries, Div. of Berevton Corp. (1 page).

"Computer Printer Stand", ad by International Corporation (1 page).

List Continued on next page.

*Primary Examiner*—Ramon S. Britts
*Assistant Examiner*—Blair M. Johnson
*Attorney, Agent, or Firm*—Knobbe, Martens, Olson & Bear

[57] ABSTRACT

The present invention comprises a printer stand on which a printer for a personal computer is supported. The printer stand is comprised of a printer support member which has a plurality of legs forming a raised surface on which the printer is rested, a retainer member slidably secured to the front end of the printer support member which varies the length of the printer support member to accommodate printers of various sizes, a receiving tray extending from the printer support member and supported independently of the printer in which fan-fold paper exiting from the printer is automatically stacked, and an inverted U-shaped bail which guides the paper out of the printer and into the receiving tray. Another aspect of the invention includes a roll stand on which a spool of rolled paper is rotatably disposed to feed paper from the roll into the printer. Preferably, the receiving tray is pivotable so that it may be disposed at various attitudes while in use or positioned underneath the printer support member when not in use. The roll stand and bail are also pivotably secured to the rear support member so that the printer stand may be folded into a compact configuration for shipping and storage.

15 Claims, 8 Drawing Figures

OTHER PUBLICATIONS

Tec–Mart, Inc., Price List Nov., 1983 (3 pages).
"PrinteRise your Printer", ad by ComputeRise, Inc. (1 page).
"Some Clear Answers About Printer Stands", ad in Personal Computing, Jan., 1983, p. 178 (1 page).
"Introducing Superstand 1", ad by Tec–Mart, Inc. (1 page).
"Questar" brochure, effective Jan. 1, 1984 by Questar Controls, Inc.
"Printer Bench Table Top Mini Printer Stand" advertisement by Manufacturers Janke Companies, Computer Products Divison (2 pages).

Fig. 1
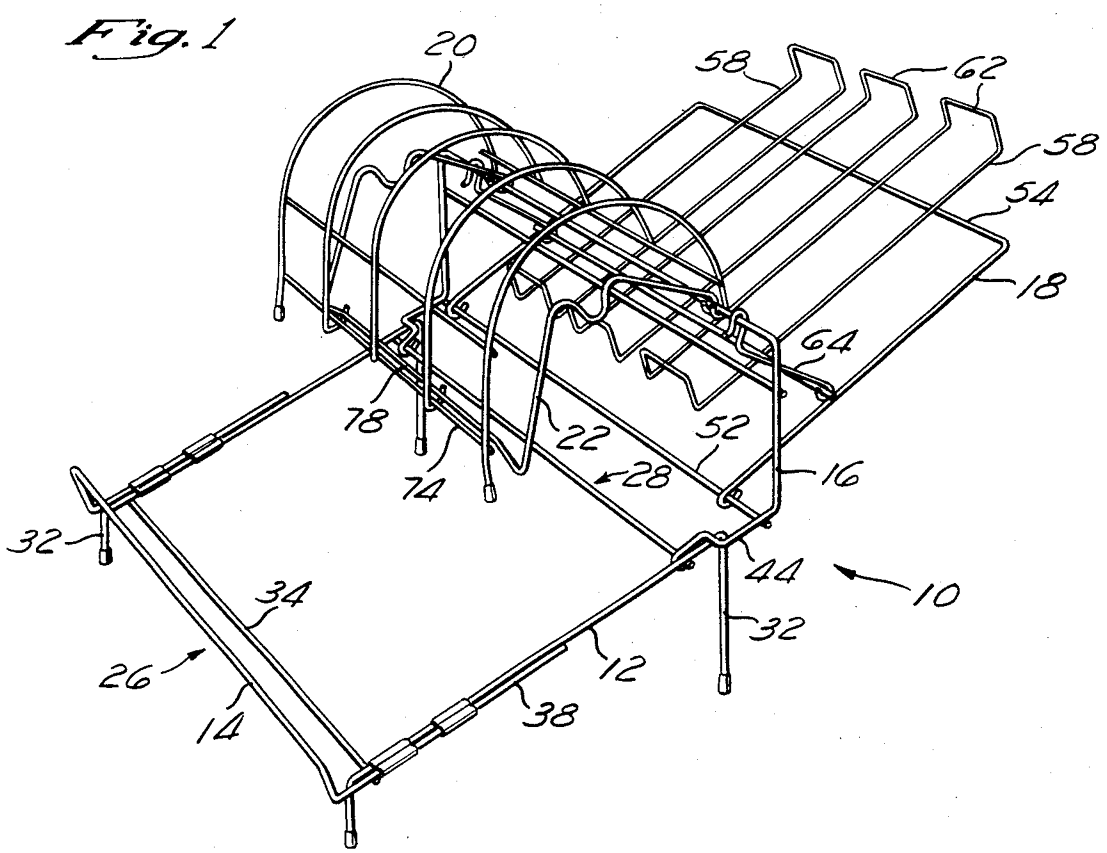
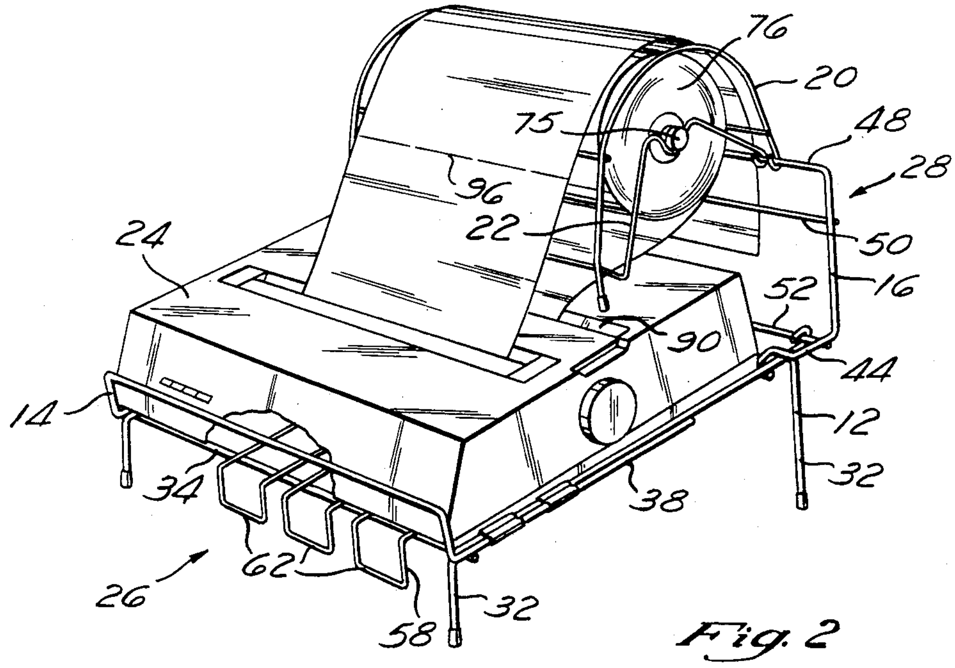
Fig. 2

Fig. 6
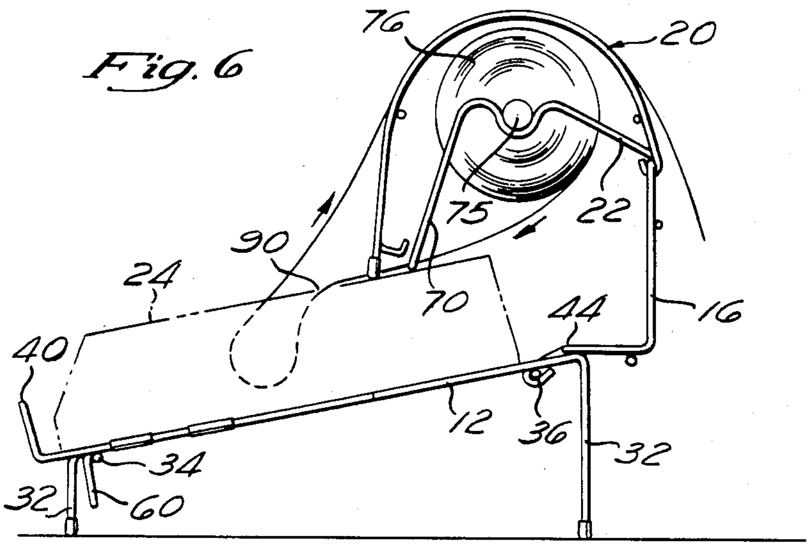
Fig. 7
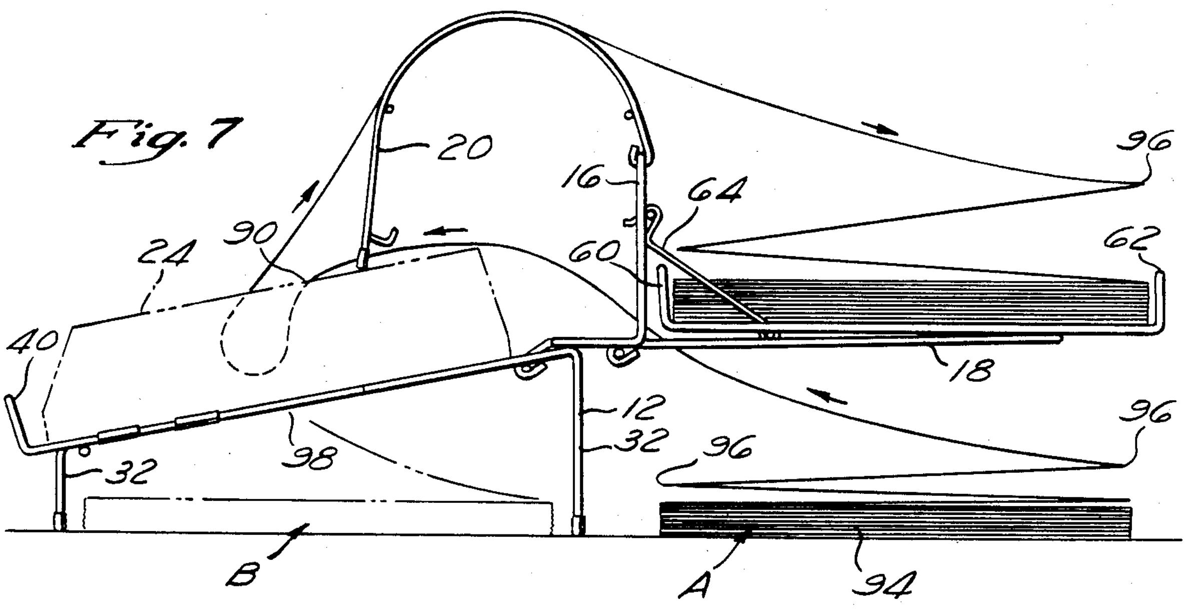
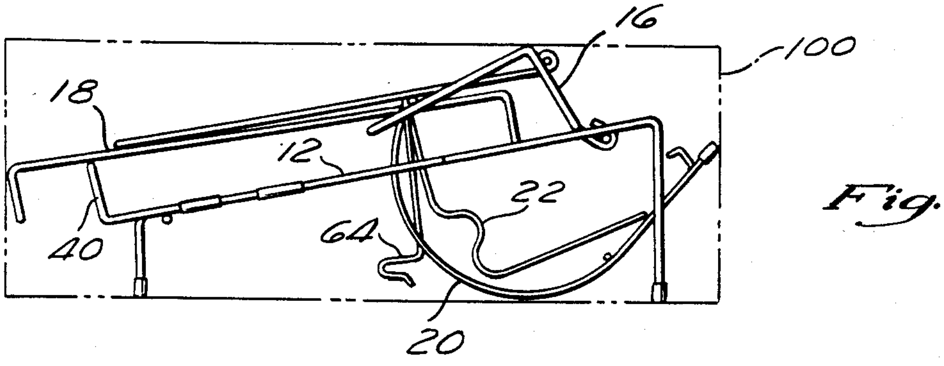
Fig. 8

PRINTER STAND

BACKGROUND OF THE INVENTION

The present invention relates generally to a stand for supporting a computer printer, and more particularly to a stand which automatically stacks fan-fold paper as it exits the printer.

Printers are frequently used in combination with personal computers in order to obtain hard copies of the data stored in the computer's memory. Typically, these printers utilize fan fold paper which is fed into the printer from a stack, and which also can be automatically stacked as it exits from the printer, if properly guided.

If printouts are relatively short, on the order of several pages, it is unnecessary to stack the fan-fold paper as it exits the printer. However, the longer the printout is, the more burdensome it is to cope with the continuous web of fan-fold paper as it exits the printer and spills onto whatever surface the printer is resting on. Thus, "receiving trays" have been developed, in which paper is automatically stacked as it exits the printer. To ensure the consistent operation of the receivng tray, some previous stands have utilized bails to direct the paper out of the printer and into the receiving tray in a manner that facilitates self-stacking of the paper. However, the bail and receiving tray have generally formed a unit fixed directly to the printer, and independent of the stand on which the printer rests. Thus, each type of printer requires a specially designed bail and receiving tray in addition to a stand which supports the printer. It is, however, desirable to have a self-supporting bail and receiving tray which is independent of the printer. Since the receiving tray will not be fixed to the printer itself, the stand will be able to universally accommodate printers of various shapes and sizes.

There are a number of other desirable features which have not been incorporated into previous printer stands. First, the stand should be able to feed spools of rolled paper into the printer, as well as fan-fold paper. Rolled paper is frequently utilized in printers in the telecommunications field, and some printers have the capacity to accepth both fan-fold paper and rolled paper. One drawback of rolled paper is that often the paper will become skewed within the printer, causing the paper to jam as it feeds into the printer on an angle. Previous rolled paper feed mechanisms have not been able to correct this problem entirely.

Another desirable feature on a printer stand is the ability to accommodate printers which have paper feeds that are offset from the center of the printer. Also, certain printers can feed paper through the bottom of the printer, as well as through the top of the printer. Many pieces of furniture designed for use with computer systems include a slot in a table top surface. Paper stacked beneath the table top can be fed through the slot and into the bottom of a printer which is resting on the table top. Ideally, a printer stand should accommodate bottom feed printers so that the stand can be utilized on the slotted table top to self-stack the exiting paper. Further, although a receiving tray is useful during long printouts of fan-fold paper, it is also advantageous for the tray to be movable so that it does not occupy space when it is not in use, such as when rolled paper is being used. Finally, it is desirable to have a printer stand which can be arranged into a compact configuration for easy shipping and storage.

Thus, a need exists for a printer stand which stacks fan-fold paper in a self-supporting receiving tray, accommodates printers of various sizes and paper-feed locations, can fed rolled paper, and can be arranged into a compact configuration for shipping and storage.

SUMMARY OF THE INVENTION

The present invention comprises a printer stand having a printer support member which forms a raised surface on which a printer rests. Preferably, a plurality of legs depend from this surface to raise it. Secured to the rear of the printer support member is a receiving tray in which paper exiting from the printer is automatically stacked. The receiving tray is supported independently of the printer which rests on the printer support member. The printer stand also includes a bail which guides the paper exiting from the printer into the receiving tray so that the paper will self stack. The bail is secured at its rear end to the printer support member, and has a front end which rests on top of the printer. The front end of the bail also has a passage through which paper is fed into the printer.

The disclosed embodiment also includes a receiving tray which is pivotably secured to the printer support member so that the receiving tray can be fixed at a plurality of attitudes when in use. Further, the receiving tray is pivotable to a position underneath the printer support when it is not in use.

Preferably, the length of the printer support can be adjusted by a retainer member which is slidably secured to the printer support member so that it may be moved in a front to rear direction, to accommodate printers of various lengths. The retainer member has a lip portion which protrudes normal to the surface formed by the printer support member, and this lip portion prevents the printer from sliding off the front of the printer support member. The bail is pivotable about the printer support member so that the front end of the bail may be raised or lowered, to accommodate printers of varying heights.

In the preferred embodiment, the printer stand includes a roll stand on which a spool of rolled paper is rotatably disposed. Paper from the spool is fed into the top of the printer. The roll stand is secured to the printer support member at one end, and rests on top of the printer at the other end, so that a spool of rolled paper resting on the roll stand is positioned beneath the bail.

Moreover, the roll stand includes a means to prevent the skewing of the rolled paper as it is fed into the printer, comprised of the front edge of the roll stand. In the disclosed embodiment, the roll stand is secured to the printer support member so that it will slide laterally from side to side, along the top of the printer. The front edge is straight and raised from the top of the printer along its center so that paper may be fed underneath the front edge and into the printer. On either side of the straight center portion, the edge bends downwardly to contact the printer so that the bent portions are coincident with the side edges of the paper passing underneath the edge. As the paper becomes skewed within the printer, the bent portions are contacted by the side edges of the paper, causing the roll stand and roll of paper to automatically slide laterally to one side or the other to compensate for the skewing of the paper.

Preferably, the roll stand and bail are also slidably secured to the printer support member so that they may slide laterally to accommodate printers with feed mechanisms that are not centered on the top of the printer.

In the preferred embodiment, the printer support member has a passage through the surface on which the printer rests. This passage permits the feeding of paper through the printer support member and into the bottom of the printer, for those printers which have bottom feeds. The printer stand is preferably fabricated from wire metal, which is inexpensive, lightweight and easy to manipulate into desired forms.

A rear support member is pivotably secured to the rear of the printer support member, and extends vertically upwards when the stand is in use. The receiving tray, bail and roll stand are themselves hinged onto the rear support member so that they are pivotable about the rear of the printer support member.

Preferably, the entire stand is folded into a compact position by tilting the rear support member forward and pivoting the receiving tray so that the receiving tray lays upside down on top of the printer support member. In this position, the bail is passed through the passage in the surface formed by the printer support member.

BRIEF DESCRIPTION OF THE DRAWINGS

FIG. 1 is a perspective view of the present printer stand with the receiving tray extending outwardly, in position for use;

FIG. 2 is a perspective view of the printer stand in FIG. 1 as used with rolled paper, with the receiving tray beneath the printer, and not in use;

FIG. 6 is a side elevation of the printer stand in the operating arrangement shown in FIG. 2;

FIG. 7 is a side elevation showing the printer stand in use with fan-fold paper, with the receiving tray in position for self-stacking of the paper, and showing an alternate position for the supply stack of paper in broken lines;

FIG. 8 is a side elevation of the printer stand as folded for shipping and storage, with a surrounding container shown in broken lines.

DETAILED DESCRIPTION OF THE PREFERRED EMBODIMENT

Figure 3:
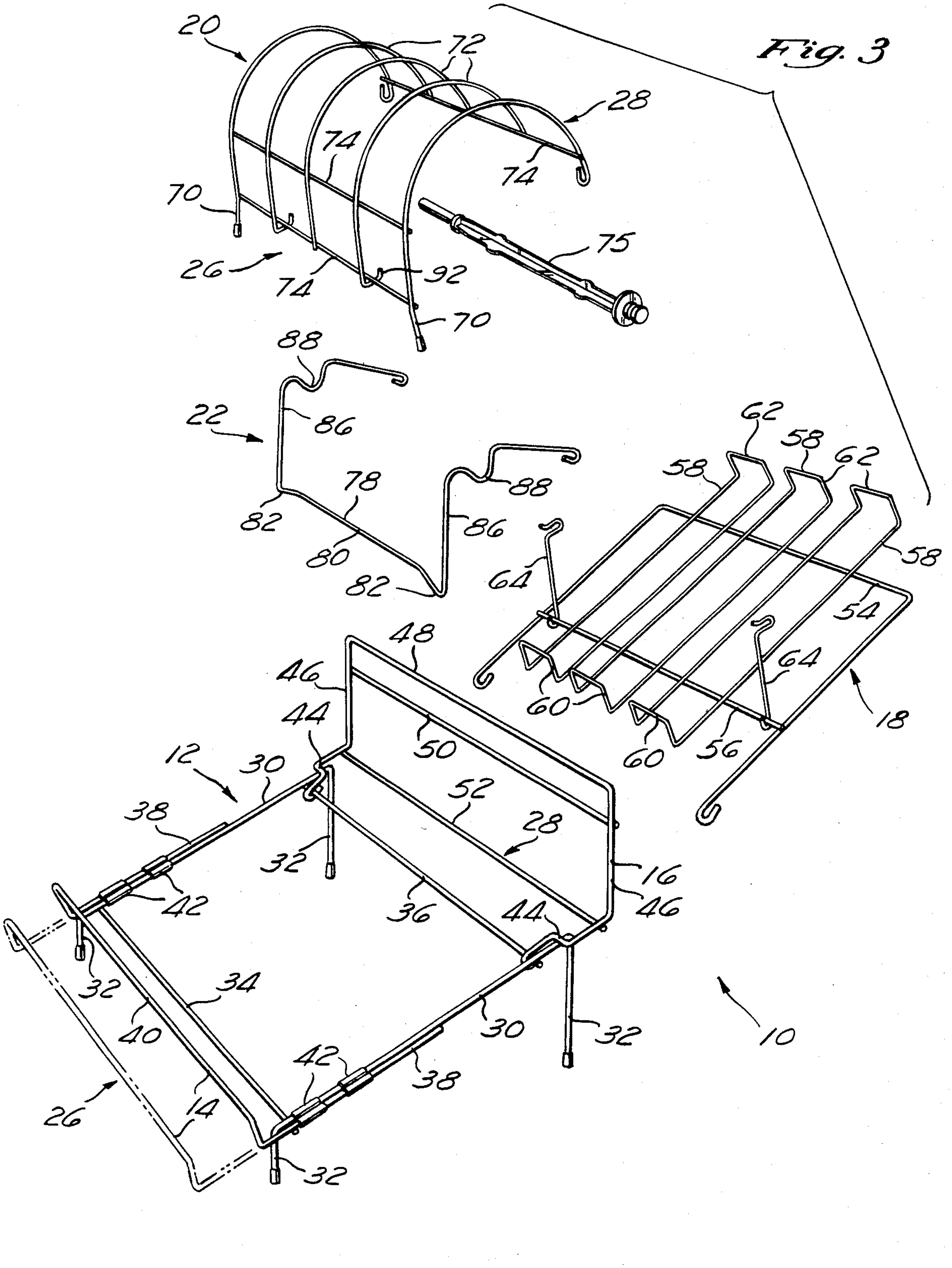
FIG. 3 is an exploded perspective view of the printer stand in FIG. 1.

Referring to FIG. 3, the present computer printer stand 10 includes a printer support member 12, a retainer member 14, a rear support member 16, a receiving tray 18 a bail 20, and a roll stand 22.

Although other materials may be used, the printer stand 10 is preferably formed from metal wire. In the illustrated embodiment, the printer support member 12 has two side bars 30 which are parallel to each other and to a longitudinal or front to rear axis (not shown) of the printer support member 12. The side bars 30 are bent at both ends to form legs 32. Connecting the side bars 30 are a front cross bar 34 and a rear cross bar 36 which are horizontal, and laterally oriented, or normal to the side bars 30. As used herein, the term "lateral" refers to the direction which is normal to the longitudinal or front to rear axis of the printer support member 12. The cross bars 34 and 36 and the side bars 30 together form a raised surface which supports the printer 24, as shown in FIGS. 2, 6, and 7. The opening bounded by the side bars 30, front and rear cross bars 34 and 36 forms a passage through which paper can be fed into the bottom of the printer 24.

The retainer member 14 is secured to the front 26 of the printer support member 12 and is slidable along the front to rear axis so that the surface formed by the printer support member 12 can be expanded, to accommodate printers of varying length. The retainer member 14 has a pair of side arms 38, which are connected by a lip portion 40. The side arms 38 are parallel to each other and to the side bars 30, and are slidable from front to rear through sleeves 42 which are fixed to the side bars 30. The lip portion 40 extends upwardly and is normal to the plane of the surface formed by the printer support member 12. As best shown in FIGS. 6 and 7, the lip portion 40 restrains the printer 24 from sliding off the printer support member 24.

The rear support member 16 is secured to the rear 28 of the printer support member 12 and serves to link the receiving tray 18, bail 20, and roll stand 22 to the rear 28 of the printer support member 12. The rear support member 16 is held in a vertically upright position by two shoulder portions 44, which rest on the side bars 30. Extending from the shoulder portions 44 are parallel side frame members 46 joined by an upper cross bar 48, which is horizontal and laterally oriented. The rear support member 16 further comprises a middle cross bar 50, and a lower cross basr 52 which are both parallel to the upper cross bar 48. The spaces between cross bars 48, 50, and 52 form passages through which paper is fed into the printer 24. Alternatively, there may be more or less than three horizontal cross bars on the rear support member 16.

Figure 4:
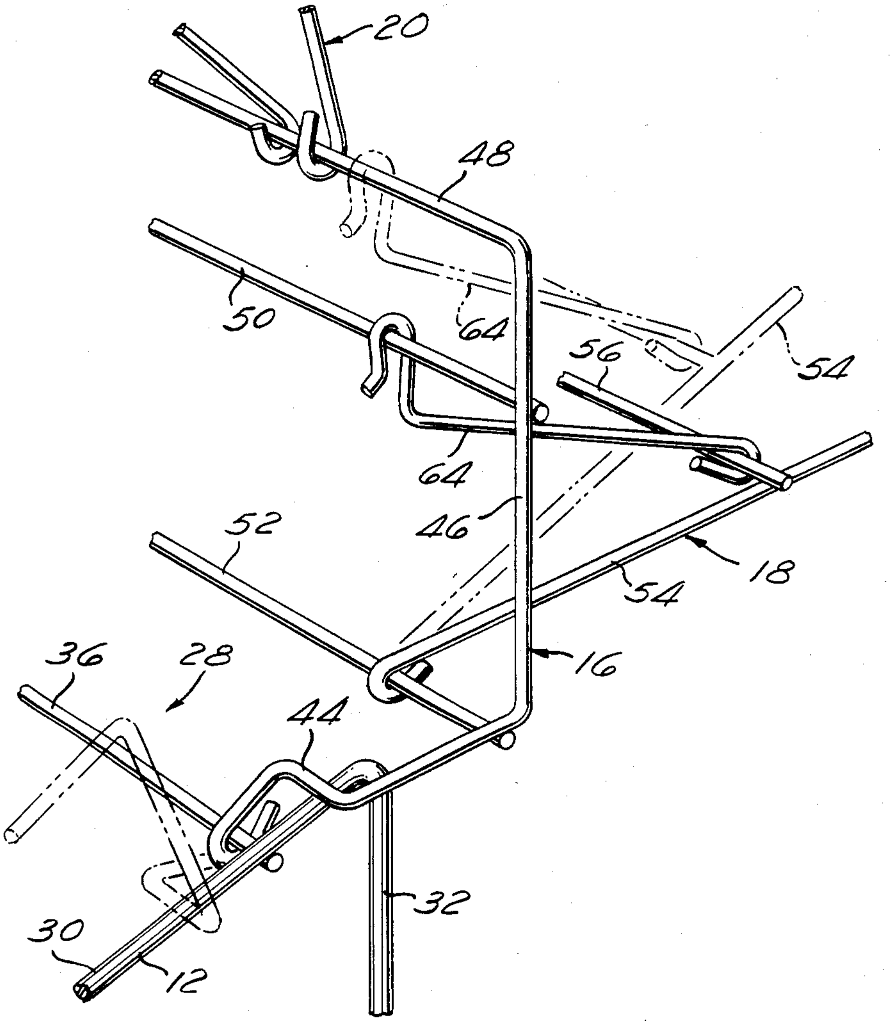
FIG. 4 is an enlarged perspective view of the printer stand of FIG. 1, showing an alternate attitude of the receiving tray in broken lines, and also showing in broken lines the position of the rear support member when the stand is folded.

As shown in FIG. 4, the shoulder portions 44 are hooked around the rear cross bar 36 so that the rear support member 16 is pivotable about the rear 28 of the printer support member 12 to a forward position shown in broken lines. As discussed in more detail below, the rear support 16 is pivoted forward when folding the printer stand 10 into a compact shape for shipping and storage.

Referring to FIGS. 1 and 4, the receiving tray 18 is pivotably hooked to the lower cross bar 52. The receiving tray 18 forms a basket within which fan-fold paper exiting from the printer will automatically stack. The receiving tray 18 is formed from a three-sided frame member 54 across which a horizontal cross bar 56 is laterally secured. Also secured to the frame 54 and support bar 56 are a plurality of sub-trays 58 having front walls 60 and rear walls 62. There is sufficient space between the front walls 60 and the lower cross bar 52 to form a passage through which paper is fed into the printer 24.

The receiving tray 18 is held in a stationary position during use by latches 64 which are pivotably secured to the support bar 56 at one end, and are removably hooked onto either the middle or upper cross bars 48 or 50 of the other end, to vary the attitude of the receiving tray 18, as shown in FIG. 4.

Figure 5:
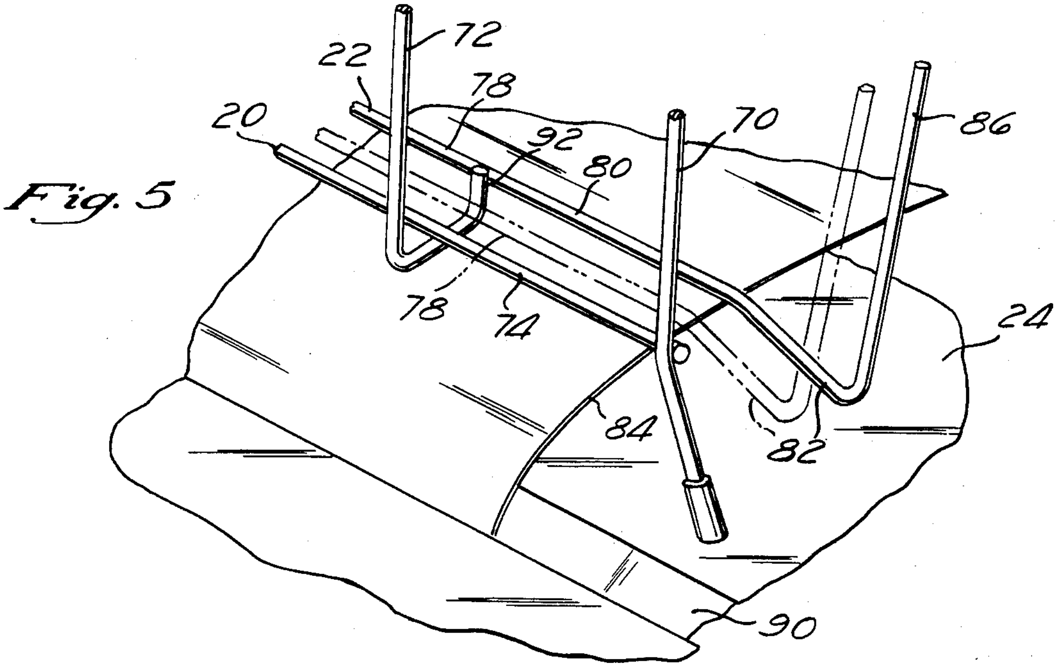
FIG. 5 is an enlarged perspective view of the printer stand in FIG. 2 showing the roll stand in position for use, and the position of the roll stand when not in use, in broken lines.

The bail 20 guides the paper exiting the printer into the receiving tray 18, as shown in FIG. 7. The bail 20 has a front end and a rear end which correspond to the front and rear directions 26 and 28 of the printer support member 12. The rear end of the bail 20 is pivotably secured to the upper cross bar 48, and the front end rests on top of the printer 24. The bail 20 is formed from a plurality of inverted U-shaped bars 70 and 72, which are connected by a plurality of horizontal cross bars 74. Two outer U-shaped cross bars 72 rest on top of the printer 24 and are spaced widely enough to permit paper to pass between them, as shown in FIGS. 2 and 5. The inner U-shaped bars 72 are raised from the surface of the printer 24, so that a passage in the bail 20 is formed, through which paper is fed into the printer 24.

Underneath the bail 20 is a roll stand 22 on which a spindle 75 rotatably rests so that a spool 76 of rolled paper may be fed into the printer 24, as illustrated in FIGS. 2 and 6. The rear end of the roll stand 22 is pivotably hooked to the upper cross bar 48, so that the roll stand 22 may be pivoted from front to rear. The front edge of the roll stand 22 rests on the printer 24 while in use, and is formed by a front bar 78 having a horizontal center portion 80 which is raised from the top of the printer 24 by bent portions 82 which extend downwardly to contact the printer at either end of the center portion 80. The space between the printer 24 and the raised center portion 80 forms a passage through which paper is fed into the printer 24. The bent portions 82 are spaced apart so that they are approximately coincident with the side edges 84 of the paper, as showin in FIG. 5. Extending rearwardly from the bent portions 82 are support legs 86 which are substantially V-shaped when viewed in side elevation, as in FIG. 6. At the apex of the V-shape is a trough 88, which rotatably supports the spindle 75. Alternatively, other means may be utilized to rotatably dispose the spindle 75 on the roll stand 22.

In operation, the printer stand 10 will feed either rolled or fanfold paper into a printer. FIGS. 2 and 6 show the printer stand 10 as used with rolled paper. The printer 24 is placed on the printer support member 12 and the retainer member 14 is adjusted so that the printer 24 is in a position to allow the front ends of the bail 20 and roll stand 22 to be behind a paper feed inlet 90 on top of the printer. Since the bail 20 and roll stand 22 are pivotable from front to rear about the axis of the upper cross bar 48, their front ends can be raised or lowered to rest on top of printers of varying heights. Thus, the printer stand is not dedicated for use with only certain printers.

Once the printer 24 is in position, paper from the spool 76 is fed underneath the front bar 78 of the roll stand 22, through the passage in the bail 20 and into the paper feed inlet 90 on the top of the printer 24. This initial manual feeding of the paper is facilitated by pivotably raising the roll stand 20 and bail 22. The roll stand 20 is designed so that as paper is fed through the printer 24, any skewing of the paper within the printer will be self-correcting to avoid jamming of the paper. Preferably, the roll stand 20 is slidable laterally along the upper cross bar 48 so that the spool 76 may be moved from side to side relative to the printer 24. As the paper is fed through the printer, the forces pulling the paper may be uneven, causing the paper to become skewed, or angled relative to the paper feed inlet 90. When this occurs, one of the side edges 84 of the paper will contact the bent portions 82 of the roll stand 22, forcing the roll stand 22 to slide to one side or the other, which automatically straightens the path of the paper as it feeds into the printer 24. This automatic correction feature eliminates the need for manual intervention in the otherwise automatic operation of the printer.

As the paper exits the printer, it is guided over the top of the bail 20 so that it does not interfere with the spool of paper 76. Further, as the paper progresses over the bail 20, the paper becomes angled vertically, increasing the surface of paper which is readable by the operator of the printer. Viewing is also improved by the angled orientation of the printer on the printer support member 12, due to the greater length of the legs 32 at the rear 28 of the printer support member than at the front 26. Preferably, the bail 20 is also slidable laterally along the upper horizontal cross bar 48 so that the bail 20 and roll stand 22 may be positioned to one side of the printer 24 to accommodate a printer which has a paper feed inlet 90 that is offset from its center.

While the printer 24 is being fed rolled paper, the receiving tray 18 is not necessarily needed, since the rolled paper cannot be stacked. Thus, as shown in FIGS. 2 and 6, the receiving tray 18 may be pivoted to a position underneath the printer support member 12, so as not to occupy space. Preferably, the rear walls 62 of the sub-trays 58 are hooked over the front cross bar 34 to maintain the receiving tray in position while not in use.

Referring now to FIG. 5, the bail 20 preferably includes J-hooks 92 extending rearwardly from the inner U-shaped bars 72 so that when rolled paper is not being used, the front bar 78 of the roll stand 22 may be raised off the top of the printer, so that it does not obstruct the flow of paper into the printer 24. Alternatively, the roll stand 20 may be removed completely, as in FIG. 7.

Again referring to FIG. 7, the stand 10 may be used with fan-fold paper. The stand is arranged so that the paper feeds into the top of the printer 24 from a supply stack 94, and is automatically stacked in the receiving tray 18 as it exits the printer 24. While in position for use, the receiving tray 18 extends rearwardly from the printer support member 12, and is in a substantially horizontal plane. The bail 20 and receiving tray 18 are both integral with the stand 10. Unlike previous stands which hve utilized bails, the receiving tray 18 is not supported by the printer 24 in this operating position, and thus does not have to be specially designed to fit each type of printer. Since the bail 20 is pivotably secured to the rear support member, it is not limited to use with a single printer, as discussed above.

When the supply stack 94 is in position A, beneath the receiving tray 18 and behind the printer support member 12, the paper is fed through passages in the receiving tray 18, rear support member 16, and bail 20, and then into the printer 24. As the paper exits the printer 24 it passes over the bail 20, which lifts paper and directs it into the receiving tray 18 in a manner so that it will self-stack. The higher the paper is lifted above the receiving tray 18 by the bail 20, the more readily the paper will self stack since the weight of the paper will cause it to fold at the perforated edges 96 at it drops into the receiving tray 18.

In addition to feeding paper into the paper feed inlet 90 on the top of the printer, paper can be fed into a bottom paper feed inlet 98 on the bottom of the printer. Paper is fed through the passage in the surface formed by the printer support member 12, and directly into the bottom paper feed inlet 98. When feeding into the bottom of the printer 24, the supply stack 94 can be located in either position B, directly beneath the printer support member 12, as shown in broken lines, or underneath the receiving tray 18, in position A. The stand 10 is thus compatible with computer furniture having slotted table tops. By resting the printer support member 12 on the table top directly above the slot, paper can be fed into the printer 24, from a supply stack 94 which is beneath the table top.

The receiving tray 18 can be adjusted, as shown in FIG. 4, to have various attitudes. By varying the attitude of the receiving tray 18, fan-fold paper of different sheet sizes can be stacked within the receiving tray 18, the distance between perforated edges 96 defining a sheet. In particular, if the receiving tray 18 is tilted forward, by hooking the latches 64 onto the upper cross bar 48, the stacking paper will slide down to the front wall 60, so that paper will more readily fold at the perforated edge abutting the front wall 60.

If automatic stacking is not desired, the supply stack 94 can be rested on the extended receiving tray 18 (not shown). Alternatively, the receiving tray 18 can be pivoted to a position beneath the printer support member 12, and paper fed into the printer 24 from a supply stack 94 in position A.

The stand 10 is also foldable into a compact shape, as shown in FIG. 8, to facilitate shipping and storage. By tilting the rear support member 16 forward, to the position shown in dotted lines in FIG. 4, and by pivoting the receiving tray 18 forward until it rests on the lip portion 40 of the retainer member 14, the stand 10 can be reduced to a compact size, which is easily packaged within the boundaries of a container 100, shown in broken lines in FIG. 8. In this folded position, the bail 20 is passed through and rests within the passage in the printer support member 12 through which the paper is fed into the bottom of the printer 24.

It is to be understood that although the present stand is fabricated from metal wire in the preferred embodiment, other types of materials, whether or not formed into wires, may be utilized to embody the inventive structure disclosed herein.

What I claim is:

1. A computer printer stand which (i) adjusts to accommodate printers of varying sizes, (ii) allows paper to be fed into either the top or the bottom of the printer, (iii) folds up into a compact configuration to facilitate shipping and storage, and (iv) automatically stacks fan fold paper as it exits the printer within a receiving tray which is supported independently of the printer, comprising:

- a printer support member having a front and rear, said printer support member forming a surface on which the printer rests, said printer support member having a plurality of legs to raise the surface on which the printer rests above the surface on which the printer stand rests, said printer support member having a passage through the surface on which the printer rests so that paper may be fed through the printer support member and into the bottom of the printer;
- an adjustable retainer member at the front of said printer support member, said retainer being slidable from front to rear to increase or decrease the length of the printer support member, respectively, to accommodate printers of various sizes on said printer support member, said retainer having a lip portion which restrains the printer from sliding off the printer support member, said lip portion protruding substantially normal to the surface formed by the printer support member;
- a rear support member pivotably secured to the rear of said printer support member, and pivotable to a position wherein said rear support member protrudes vertically upward from said printer support member, said rear support member having a passage through it to permit paper to be fed through the rear support member and into the top of the printer;
- a receiving tray pivotably secured to said rear support member, said receiving tray being pivotable to position wherein said receiving tray extends rearwardly from said printer support member and forms a surface on which fan fold paper is automatically stacked as it exits from the printer, said receiving tray being pivotable to a position underneath the printer support member for storage of the receiving tray when it is not in use;
- a bail pivotably secured to said rear support member, said bail having an inverted U-shape when viewed in side elevation, the rear end of said U-shaped bail being pivotably secured to said rear support member, the front end of said bail resting on the top of the printer, said bail being shaped to guide paper exiting the printer over the rear support member and into the receiving tray, said bail also having a passage through its front end to permit paper to be fed into the top of the printer, said front end being raised and lowered as the bail pivots, to accommodate printers of varying heights; and
- said printer stand being foldable into a compact configuration by pivoting said receiving tray and rear support to a forward position so that the receiving tray lays upside down on top of the printer support, and so that the front of the bail passes through the surface formed by the printer support member.

2. The printer stand of claim 1, wherein said printer stand further comprises means to feed a spool of rolled paper into the printer, including means to prevent the skewing of the rolled paper as it feeds into the printer, comprising:

- a roll stand for rotatably supporting a roll of paper, the rear end of said roll stand being pivotably supported on the rear support member and being slidable from side to side on said rear support, the front end of said roll stand resting on top of the printer, said front end comprising a lateral bar which has a center portion that is substantially parallel to the top of the printer and which is raised above the top of the printer to form a passage which allows paper from the roll to pass beneath the bar, and into the top of the printer, said bar being downwardly on either side of the center portion to contact the top of the printer, the bent portions of the bar being coincident with the side edges of the paper passing underneath the bar, said bent portions being contacted by the paper as the paper becomes skewed within the printer and shifts to one side, causing said roll stand to automatically slide to one side or the other to change the position of the roll, compensating for the skewing of the paper.

3. The printer stand of claim 1, wherein said bail is slidably secured to said rear support member such that the bail can slide laterally from side to side relative to the printer support member to accommodate printers with paper feed mechanisms that are not centered on the printer.

4. The printer stand of claim 2, wherein there are hooks protruding rearwardly from the front end of the bail so that the front bar of the roll stand can be lifted off the top of the printer and latched onto the hooks to maintain the roll stand spaced from the printer to permit the feeding of fan fold paper through the passage in the bail, unobstructed by the roll stand, and so that when the bail is pivoted rearwardly to manually feed paper into the printer, the roll stand is lifted and pivoted along with the bail.

5. The printer stand of claim 1 wherein:

said printer support member comprises two parallel side bars which run from front to rear and which are bent at either end to form front and rear legs, said side bars being connected by a front cross bar and a rear cross bar, which are horizontal, parallel to each other, and normal to the side bars, said side bars and cross bars forming the surface on which the printer rests, the space between the front and rear cross bars forming a passage through which paper is fed into the bottom of the printer and in which the bail rests when the stand is folded;

said retainer member has two arms parallel to the side bars, said arms being slidable from front to rear along the side bars, through sleeves which are coupled to the side bars, said retainer member further comprising a lip portion connecting the two arms and which protrudes upward, normal to the arms, said rear support member is pivotable about the rear cross bar of the printer support member, said rear support member comprising two shoulder portions which rest on either side bar of the printer support member when the rear support member is upright and in use, said shoulder members being connected to parallel side frame members which are vertical when the rear support member is upright and in use, said side frame members being joined by a lower horizontal cross bar, a middle horizontal cross bar and an upper horizontal cross bar, said cross bars being parallel to each other and normal to said side frame members.

said receiving tray being pivotably secured to the lower cross bar of the rear support member, said receiving tray being held in a stationary position by latches pivotably secured to the receiving tray which hook onto either the upper or middle cross bars of the rear support member to provide an adjustable attitude of the receiving tray, said receiving tray further comprising vertically upright front and rear wall members which form a basket within which fanfold paper is stacked; and said bail comprises a plurality of inverted U-shaped bars, the rear ends of two U-shaped bars being pivotably secured to a horizontal bar at the rear of the printer support member, said bail further comprising a plurality of horizontal cross bars secured to the U-shaped bars, two U-shaped bars being spaced wider than the paper which is fed through the printer, the front ends of said spaced U-shaped bars resting on the top surface of the printer, the space between the top of the printer and the ends of the other U-shaped bars forming a passage through which paper is fed into the printer.

6. The printer stand of claim 2, wherein said roll stand is fabricated from metal wire.

7. The roll stand of claim 6, wherein said roll stand comprises a bent front bar and two roller support legs extending rearwardly from the bent portions of said front bar, said roller support legs being substantially V-shaped when viewed in side elevation and having a trough formed at the apex of the V, said trough being formed to rotatably support a spindle passing through a roll of paper, the rear end of said V-shaped roller support legs being pivotably hooked around a substantially horizontal bar at the rear of said printer support member.

8. A computer printer stand formed from metal wire which automatically stacks fan-fold paper as it exits the printer, said stand comprising:

a printer support member which forms a raised surface on which a computer printer rests, said printer support member having a front and a rear;

a receiving tray supported independently of the printer and extending rearwardly from said printer support member, said receiving tray configured to automatically stack fan fold paper as the paper exits a printer resting on said printer support member, said receiving tray having a passage through it to permit paper to be fed into the top of the printer from a stack of fan fold paper stored behind the printer support member and beneath the receiving tray;

a bail having a front end which rests on the top of the printer and a rear end which is secured to the rear of the printer support member, the front end of said bail having a passage through it to permit the feeding of paper into the top of the printer, said bail being shaped so that the paper exiting the printer being guided by the bail into the receiving tray will automatically stack within the receiving tray;

wherein said receiving tray is secured to said printer support member by means of a rear support member, said receiving tray being pivotably secured to said rear support member, said rear support member being pivotably secured to the rear of said printer support member and pivotable from front to rear about a horizontal axis to a position wherein said rear support member extends upwardly from said printer support member at a substantially vertical orientation, said rear support member having a passage through which paper is fed from behind the printer support member and into the top of the printer, said stand being foldable into a compact configuration by pivoting said rear support member and receiving tray to a forward position so that said receiving tray lays in an upside down position on top of said printer support member, and said bail rests within a passage member; and wherein a horizontal rear cross bar extends laterally across the rear of said printer support member, said rear support member being pivotably hooked around said horizontal rear cross bar, and said rear support member has a plurality of laterally oriented horizontal cross bars, the rear end of said bail being pivotably hooked around one rear support horizontal cross bar, and said receiving tray also being pivotably hooked around one rear support horizontal cross bar.

9. The printer stand of claim 8 wherein said stand further comprises latches secured to said receiving tray which are hooked onto said rear support member horizontal cross bars at various vertical heights to vary the attitude of said receiving tray while in use, to permit said receiving tray to automatically stack the papers of varying sizes.

10. A computer printer stand which feeds rolled paper into a printer, said stand formed from metal wire and comprising:

a printer support member which forms a raised surface on which a computer printer rests, said printer support member having a front and a rear;

a roll stand for rotatably supporting a spool of rolled paper so as to feed said paper into the top of a printer resting on said raised surface, said roll stand having a front end and a rear end, the rear end being secured to the rear of said printer support member and the front of said roll stand positioned to rest on top of said printer; and means on said roll stand to prevent the skewing of the paper being fed into the printer, including a lateral edge at the front of said roll stand, the center portion of said edge being raised from and substantially parallel to the top of the printer to form a passage for feeding paper underneath said center portion and into the printer, said edge bending downwardly on either side of the center portion where the edge contacts the printer, the bent portions being sufficiently spaced apart to be coincident with the side edges of the paper passing underneath that edge, and said roll stand is slidable from side to side, said bent portions being contacted by the paper as the paper becomes skewed within the printer and shifts to one side, causing said roll stand to automatically slide laterally to one side or the other to change the position of the roll, to compensate for the skewing of the paper, wherein said roll stand comprises a bent front bar forming said front end and two roller support legs extending rearwardly from the bent portions of said front bar, said roller support legs being substantially V-shaped when viewed in said elevation and having a trough formed at the apex of the V, said trough being formed to rotatably support a spindle passing through a roll of paper, the rear end of said V-shaped roller support legs being pivotably hooked around a substantially horizontal bar at the rear of said printer support member.

11. A computer printer stand which feeds rolled paper into a printer, said stand comprising:

a printer support member which forms a raised surface on which a computer printer rests, said printer support member having a front and a rear;

a roll stand for rotatably supporting a spool of rolled paper so as to feed said paper into the top of a printer resting on said raised surface, said roll stand having a front end and a rear end, the rear end being secured to the rear of said printer support member and the front of said roll stand positioned to rest on top of said printer; and a bail which is shaped to guide paper over the roll stand as the paper exits the printer, said bail having a front end which rests on top of the printer and a rear end which is secured to the rear of the printer support member, said bail arching over the roll stand and a roll of paper disposed thereon, the front end of said bail having a passage through it to permit the feeding of paper through the bail and into the printer.

12. The printer stand of claim 11, wherein said bail and said roll stand are pivotable from front to rear about a laterally oriented horizontal axis to facilitate the initial manual feeding of paper into the printer.

13. The roll stand of claim 11, wherein said bail is fabricated from metal wire.

14. The printer stand of claim 12, further comprising a retainer member having a lip portion which restrains the printer from sliding off the front of the printer support member, said lip portion protruding substantially normal to the surface formed by the printer support member, said retainer member being slidably secured to said printer support member so that said lip portion can be moved along a front to rear axis to vary the front to rear length of said printer support member, to accommodate printers of varying lengths, said roll stand and said bail being pivotable to raise and lower their fronts to rest on top of printers of varying heights.

15. The printer stand of claim 11 wherein said bail and said roll stand are slidable laterally from side to side relative to the printer support member to accommodate printers with paper feed mechanisms that are not centered on the top of the printer.

* * * * *